United States Patent [19]

Donaldson

[11] Patent Number: 5,090,811
[45] Date of Patent: Feb. 25, 1992

[54] OPTICAL RADIUS GAUGE

[75] Inventor: Charles W. Donaldson, Cincinnati, Ohio

[73] Assignee: General Electric Company, Cincinnati, Ohio

[21] Appl. No.: 597,275

[22] Filed: Oct. 15, 1990

Related U.S. Application Data

[63] Continuation of Ser. No. 361,014, May 31, 1989, abandoned.

[51] Int. Cl.$^5$ ............................................. G01B 11/24
[52] U.S. Cl. ......................................... 356/376; 356/1
[58] Field of Search .................................... 356/1, 376

[56] References Cited

U.S. PATENT DOCUMENTS

| | | | |
|---|---|---|---|
| 3,625,618 | 12/1971 | Bickel | 356/376 |
| 4,180,322 | 12/1979 | Farcinade | 356/1 |
| 4,226,536 | 10/1980 | Dreyfus et al. | 356/376 |
| 4,325,640 | 4/1982 | Dreyfus et al. | 356/376 |
| 4,630,927 | 12/1986 | Fulkerson | 356/372 |
| 4,634,879 | 1/1987 | Penney | 250/560 |
| 4,705,401 | 11/1987 | Addleman et al. | 356/376 |
| 4,708,483 | 11/1987 | Lorenz | 356/376 |
| 4,724,480 | 2/1988 | Hecker et al. | 358/101 |
| 4,764,016 | 8/1988 | Johansson | 356/376 |
| 4,796,997 | 1/1989 | Svetkoff et al. | 356/376 |
| 4,875,777 | 10/1989 | Harding | 356/376 |
| 4,939,379 | 7/1990 | Horn | 356/376 |

FOREIGN PATENT DOCUMENTS

| | | | |
|---|---|---|---|
| 2536167 | 5/1984 | France | 356/376 |
| 37457 | 4/1978 | Japan | 356/1 |
| 31005 | 2/1989 | Japan | 356/376 |

OTHER PUBLICATIONS

Kevin G. Harding, "Improved Optical Design for Light Stripe Gages", SME Sensors Symposium 1986.
SIGMA Optical Profilometer System, brochure, Sigma Research, Inc., Richland, Wash.
Article titled "Non-Contact Measurement of Radii", by Charles W. Donaldson, published in Spring, 1988 (Jun.) issue of Leading Edge Magazine.

*Primary Examiner*—F. L. Evans
*Attorney, Agent, or Firm*—Jerome C. Squillaro; Charles L. Moore, Jr.

[57] ABSTRACT

A non-contacting system for measuring the radius of a curved surface. The system includes a light source for illuminating the surface along the intersection of the surface with a plane which includes the radius to be measured. A lens, arranged such that its principal axis is perpendicular to the plane which includes the radius to be measured, is utilized to project a distortion free image of the intersection onto the photosensitive array within a video camera. The video signal generated by the camera is provided to a microcomputer which calculates surface radius from the image data included in the video signal.

10 Claims, 3 Drawing Sheets

OPTICAL RADIUS GAUGE

This is a continuation, of application Ser. No. 07/361,014, filed May 31, 1989 now abandoned.

The present invention relates to a radius measuring device and more particularly to a non-contacting system using optical triangulation to determine the radius of a curved surface.

BACKGROUND OF THE INVENTION

Aircraft engine components, and similarly the components of many other high performance machines, are manufactured so as to avoid sharp edges and tight corners, as sharp edges and tight corners are areas where stress concentrations can occur increasing the possibility of crack formation. Part edges are often chamfered or radiused to dull sharp edges thereby reducing the probability of crack formation. Accurate measurement of edge and corner radii is important to ensure component quality.

Presently used methods for measuring the radius of edges and corners include the use of hand held pre-cut radius gauges and the use of wax impressions. Radius inspection with pre-cut radius gauges involves placing different gauges of known radii in contact with the part surface and back illuminating the part and gauge. The part edge is assumed to have the same radius as a gauge which, when placed in contact with the part edge, allows no light to pass through the region where the gauge contacts the part surface. This method of measuring edge or corner radii is not practical or accurate when measuring small radii or compound radii.

Simple and compound radii can be measured by forming a wax impression of the part surface. The wax impression must then be evaluated on an optical comparator, usually located in an area removed from the part location. The accuracy of such radius measurement depends upon the judgment and interpretation of the operator of the optical comparator. The process is often slow, subjective, labor intensive and eye fatiguing.

In some situations coordinate measuring machines can be utilized to measure part radius. Coordinate measuring machines produce adequate results but are expensive, have a slow processing rate and are not easily adapted to the production environment.

The complex geometries of aircraft engine components adds complexity to the measurement of edge and corner radii by any of the procedures discussed above. Part surfaces may contain compound curvatures and edges and corners which are difficult to access. The parts themselves are often difficult to handle and manipulate.

The present invention provides a fast and accurate means for measuring edge and corner radii, solving many of the problems associated with previous inspection methods.

OBJECTS OF THE INVENTION

It is a primary object of the present invention to provide a new and improved apparatus for measuring the radius of a curved surface.

A more specific object of the present invention to provide an optical triangulation system utilizing a unique lens arrangement to obtain profile information from a surface.

It is also an object of the present invention to provide a non-contacting means for quickly and accurately measuring the radius of a curved surface.

SUMMARY OF THE INVENTION

In accordance with the principles of the present invention, there is provided an apparatus for measuring the radius of a curved surface, comprising means for illuminating the surface along the intersection of the surface with a plane which includes the radius to be measured, optical means for forming an image of the intersection; and means for calculating the radius of the surface from the image of the intersection.

The novel features believed to be characteristic of the present invention are set forth in the claims. The above and other objects of the present invention together with the features and advantages thereof will become apparent from the following detailed specification when read in conjunction with the accompanying drawing.

DETAILED DESCRIPTION OF THE INVENTION

Figure 1:
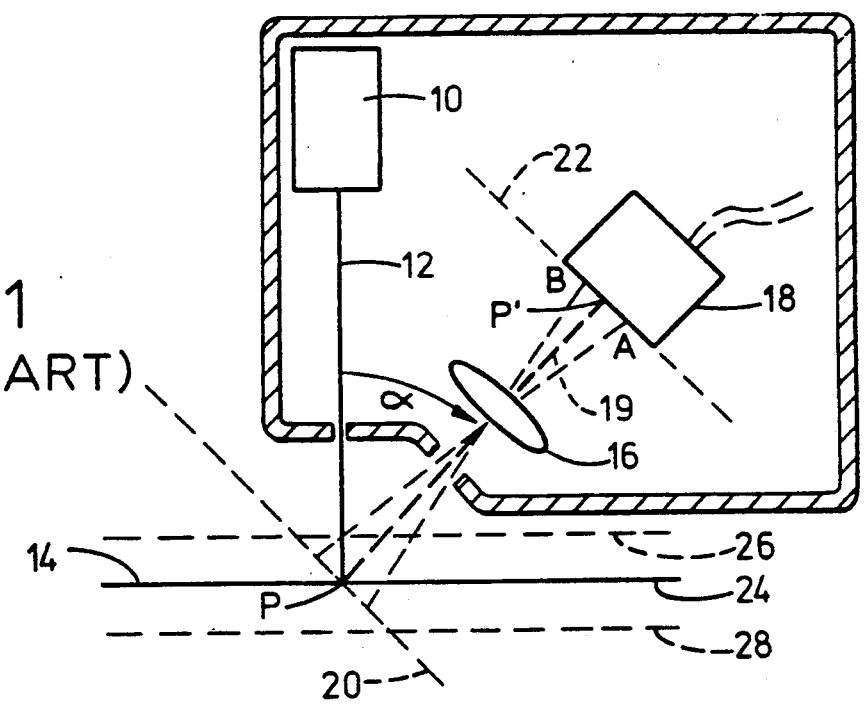
FIG. 1 is a schematic illustration of the principal components of a traditional triangulation system for measuring distance.

The present invention utilizes an improved optical triangulation system to obtain position information from a curved surface. The principal components of a traditional triangulation system for measuring distance are illustrated schematically in FIG. 1. The system of FIG. 1 includes a HeNe laser 10 for projecting a beam of light 12 at a point P on the surface of an object 14, imaging optics such as a lens 16, and a photosensitive array 18. Laser 10 and lens 16 are arranged so that light beam 12 and the principal axis 19 of lens 16 intersect at point P, forming an acute angle $\alpha$. Light reflected from an object residing in object plane 20 will be focused into an image residing in an image plane 22. Photosensitive array 18 is positioned such that the photosensitive surface of the array is placed in image plane 22. With object 14 situated at position 24, a light spot is formed by impingement of light beam 12 at point P. Lens 16 forms an image of the light spot on the surface of photosensitive array 18 at the point identified as point P'. If object 14 is located above position 24, such as at position 26, an out-of-focus image of the light spot will be formed at point A on the surface of photosensitive array 18. Likewise, if object 14 is located below position 24, such as at position 28, an out-of-focus image of the light spot will be formed at point B on the surface of photosensitive array 18. If angle $\alpha$ is known, the position of the surface of object 14 can be determined from the position of the image formed on array 18.

One difficulty associated with the optical arrangement shown in FIG. 1 is that points of interest on object 14 not located in object plane 20 will appear out-of-focus when imaged onto photosensitive array 18. Secondly, software employed to calculate object position or to construct a mathematical model of the object must include trigonometric functions to correct for distortion of points not located in the object plane.

Figure 2:
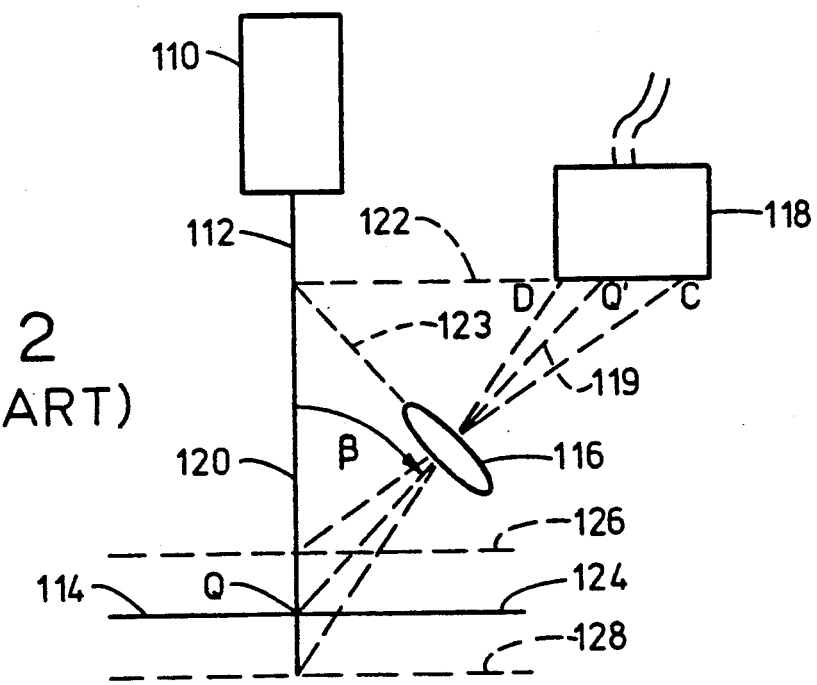
FIG. 2 is a schematic illustration of a triangulation system with the principal components shown in the "Scheimpflug Condition"

FIG. 2 is a schematic illustration of a triangulation system with the principal components shown in a configuration which eliminates the out-of-focus problem discussed above in connection with FIG. 1. The system of FIG. 2 includes a HeNe laser 110 for projecting a beam of light 112 at a point Q on the surface of an object 114, imaging optics such as a lens 116, and a photosensitive array 118. Laser 110 and lens 116 are arranged so that light beam 112 and the Principal axis 119 of lens 116 intersect at point Q, forming an acute angle $\beta$. This system differs from the system of FIG. 1 in the positioning of the photosensitive array and lens in relation to the beam of light. In the system of FIG. 1 the components are arranged so that object plane 20, image plane 22, and the optical plane (the plane through the center of lens 16 normal to the lens' principal axis 19) are parallel, whereas in the system of FIG. 2 the components are arranged so that the object plane (120), the image plane (122), and the optical plane (123) intersect in a line. Additionally, the object plane includes light beam 112. As in the system of FIG. 1, the surface of photosensitive array 118 resides in the image plane.

With object 114 situated at position 124, a light spot is formed by impingement of light beam 112 at point Q. Lens 116 forms an image of the light spot on the surface of photosensitive array 118 at the point identified as point Q'. If object 114 is located above position 124, such as at position 126, an image of the light spot will be formed at point C on the surface of photosensitive array 118. Likewise, if object 114 is located below position 124, such as at position 128, an image of the light spot will be formed at point D on the surface of photosensitive array 118. If angle $\beta$ is known, the position of the surface of object 14 can be determined from the position of the image formed on array 18.

The optical arrangement shown in FIG. 2, identified as the "Scheimpflug condition," eliminates the out-of-focus problems associated with the system of FIG. 1, since the light beam 112 and light spot formed on the object surface always reside in the object plane. However, movement of the image along the detector surface is not linear with movement of the object surface, and a rather complex mathematical correction must be made to calculate object distance from the position of the image on the detector surface.

Figure 3:
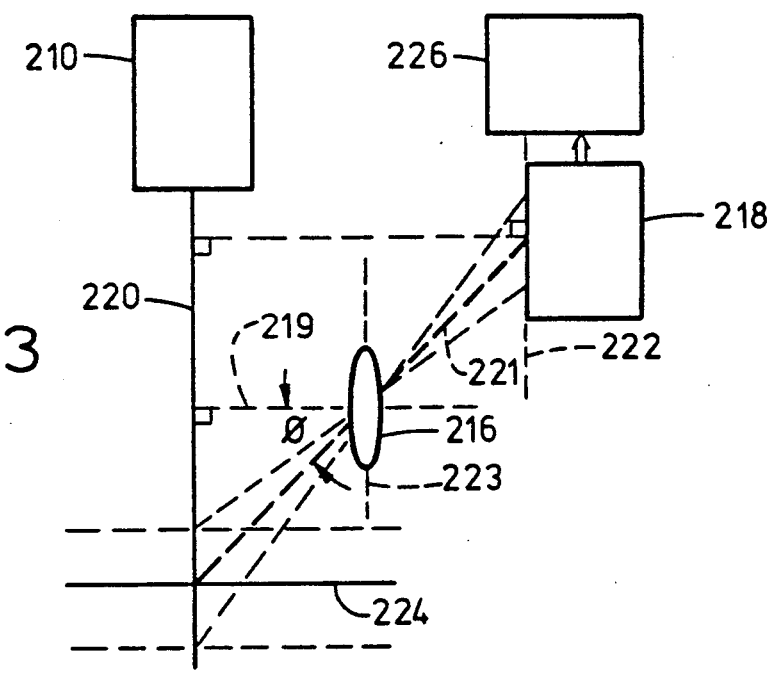
FIG. 3 illustrates schematically the principal components that comprise the optical portion of the apparatus of the present invention.

FIG. 3 illustrates schematically the principal components that comprise the optical portion of the radius gauge of the present invention. The system of FIG. 3 includes a HeNe laser 210, imaging optics such as a lens 216, and a television camera 218. Lens 216 is placed so that the object plane (220), image plane (222), and optical plane (223) are mutually parallel and the object plane includes the radius to be measured. Camera 218 is positioned so that the surface of the photosensitive array within the camera resides in image plane 222. Lens 216 has a secondary axis 221 which forms an angle $\phi$ with the lens' principal axis (219). Preferably angle $\phi$ is between 20 and 60 degrees. Object 214 and camera 218 are positioned along secondary axis 221 on opposite sides of lens 216. The system further includes a computer 226 coupled to receive the output of camera 218.

Figure 4:
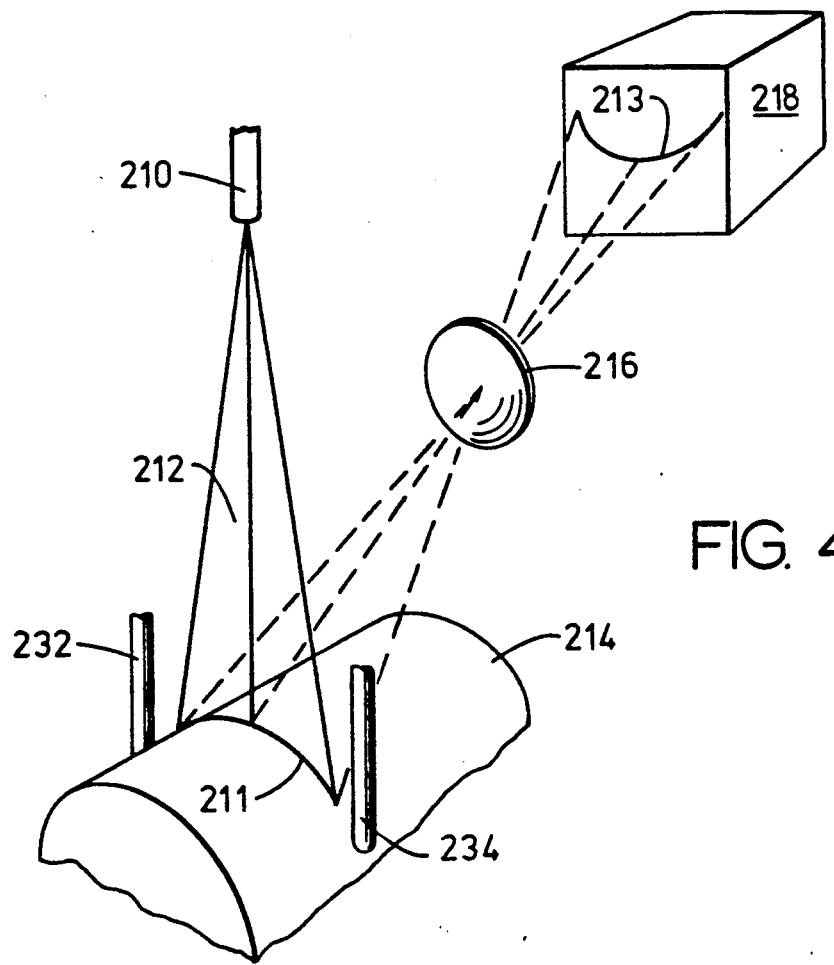
FIG. 4 is a perspective view of the object being measured in FIG. 3, viewed from the right in FIG. 3.

In operation, an object 214 having a radius to be measured is placed at position 224. HeNe laser 210 projects a line of light along the intersection of the object surface with the plane (object plane 220) which includes the radius to be measured. This line of light may be formed by scanning a laser beam across the object surface. A perspective view of object 214 and line of light 211 formed thereon is shown in FIG. 4. The object is viewed from the left in FIG. 3. Laser 210 produces a fan of light 212 which is projected onto the object surface forming line of light 211. Line of light 211 highlights and defines the object radius to be measured. Light reflected from the object surface is focused by lens 216 onto the photosensitive array of camera 218, forming an inverted image 213 of line of light 211.

With the photosensitive array of camera 218 residing in image plane 222, lens 216 focuses an undistorted image of line of light 211 onto the array. If the distance between lens 216 and object plane 220, and the distance between lens 216 and image plane 222 are each set at twice the focal length of lens 216, line of light 211 and the image formed by lens 216 will be equal in size. The spacing between lens 216, object plane 220, and image plane 222 may be varied to increase or decrease the magnification of the image.

The image formed onto the camera's photosensitive array is converted by the scanning mechanism within the camera into a video signal. A typical CCD camera includes a 256×256 photosensitive array matrix, thus resolving the received image into 65,536 picture elements or pixels. The video signal is provided to computer 226 which converts the video signal into digital pixel data, assigning a luminance value of between 0, for black, and 255, for white, to each picture element of the matrix.

Pixel points associated with the image of line of light 211 will have higher luminance values than pixel points corresponding to background points which are not illuminated. Computer 226 identifies those pixels corresponding to line of light 211 and determines the midline of the line of light. The coordinates of three points along this midline are then selected. From these coordinates the origin and radius of a circle which includes these three points is mathematically determined as described below.

The three points selected have coordinates $(x_1, y_1)$, $(x_2, y_2)$ and $(x_3, y_3)$ respectively. The circle which includes these points will have radius r and an origin with coordinates $(x_0, y_0)$. Because the square of the radius of a circle is equal to the sum of (1) the square of the distance along the x-axis between the origin and a point on the circle and (2) the square of the distance along the y-axis between the origin and the same point on the circle, the following three equations can be written:

$$(x_1-x_0)^2+(y_1-y_0)^2=r^2 \qquad \text{EQN 1}$$

$$(x_2-x_0)^2+(y_2-y_0)^2=r^2 \qquad \text{EQN 2}$$

$$(x_3-x_0)^2+(y_3-y_0)^2=r^2 \qquad \text{EQN 3}$$

The three equations provided above include three unknown variables: $x_0$, $y_0$ and r. Matrix algebra and other mathematical techniques for solving n equations having n variables are well known. Computer 226 determines the radius of a circle that includes the three points selected from the line of light formed on the object surface. The radius of this circle is the radius of the object edge being measured.

Figure 5:
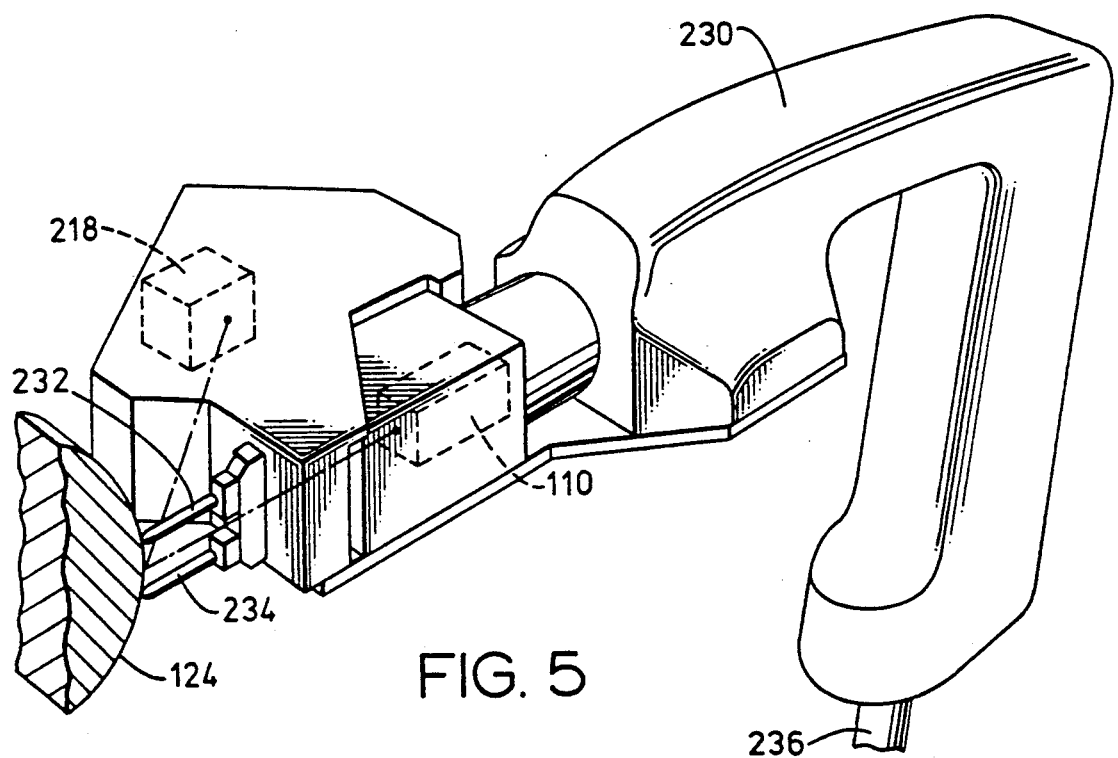
FIG. 5 is a perspective view, partially cut away, of a non-contacting radius measurement system in accordance with the present invention, the system includes a hand-held device for obtaining raw radius data.

FIG. 5 is a perspective view, partially cut away, of a non-contacting radius measurement system in accordance with the present invention. The system includes a hand-held housing 230 which contains the lens, camera and other components of the triangulation system shown in FIG. 3. Protruding from the front of housing 230 are two pins (232 and 234). These two pins are located in the object plane of lens 216 and assist the operator in positioning the housing over the object (214) to be measured. One pin is placed on each side of the curve or radius to be measured as shown in FIG. 4. A coaxial cable 236 carries the video output of camera 218 from the housing to a remotely located computer. Similarly, a fiber optic cable may be utilized to conduct a light beam from a remotely located light source into housing 230 for projection onto the object surface.

Several advantages of this invention are readily apparent. The system presented above provides a fast and accurate means for measuring edge and corner radii, eliminating many of the problems associated with previous inspection methods wherein hand held pre-cut radius gauge or wax impressions are utilized to measure radii. The hand-held embodiment of the present invention provides a means for measuring the radii of compound curvatures and edges and corners which are difficult to access, or for measuring parts which are difficult to handle and manipulate.

From the foregoing specification it will be clear to those skilled in the art that the present invention is not limited to the specific embodiment described and illustrated and that numerous modifications and changes are possible without departing from the scope of the present invention. For example, the invention as described projects a line of light across the surface of the part to be measured. The light source can be a HeNe laser, as described, or any other means for generating a visible light beam. The system could also be modified to utilize non-visible light, such as ultraviolet or infrared radiation. Also, since the system requires the coordinates of only three points along the object surface to calculate a radius, a line of light need not be projected onto the surface. Three light spots, projected onto the surface and residing in the plane which includes the radius to be measured, provide sufficient operation of the system.

These and other variations, changes, substitutions and equivalents will be readily apparent to those skilled in the art without departing from the spirit and scope of the present invention. Accordingly, it is intended that the invention to be secured by Letters Patent be limited only by the scope of the appended claims.

What is claimed is:

1. Apparatus for measuring the radius of a curved surface, comprising:
    means for illuminating said surface to form a line of light on said surface along the intersection of said surface with a first plane;
    optical means for forming an image of said line of light;
    means for determining, from said image, a coordinate location for at least three points along said line of light; and
    means for calculating the radius of said surface from said coordinate location of each of said at least three points.

2. Apparatus according to claim 1, wherein said illuminating means comprises:
    means for projecting a light beam at said surface, said light beam being coplanar with said first plane; and
    means for scanning said light beam along said surface within said first plane.

3. Apparatus according to claim 1, wherein said optical means includes a lens positioned such that the principle axis of said lens is perpendicular to said first plane.

4. Apparatus for measuring the radius of a curved surface, comprising:
    means for illuminating said surface to form a line of light on said surface along an intersection of said surface with a first plane;
    a photodetector positioned such that a surface of said photodetector is in a second plane parallel with said first plane;
    a focusing lens for receiving light reflected from said surface and forming an image of said line of light on said photodetector surface;
    said lens positioned such that a principal axis of said lens is perpendicular to said first and second planes;
    said lens having a secondary axis forming an angle of between 20 and 60 degrees with said principal axis, said line of light and said photodetector being positioned along said secondary axis on opposite sides of said lens;
    means for determining, from said image, a coordinate location for at least three points along said line of light; and
    means for calculating the radius of said surface from said coordinate location of each of said at least three points.

5. Apparatus according to claim 4, wherein:
    the distance between said first plane and said lens is twice the focal length of said lens; and
    the distance between said second plane and said lens is twice the focal length of said lens.

6. Apparatus for obtaining a profile of a surface, comprising:
    means for illuminating a line along said surface, said line being defined by an intersection of said surface with a first plane;
    a photodetector positioned such that a surface of said photodetector is in a second plane parallel with said first plane;
    a focusing lens for receiving light reflected from said surface and for forming an image of said illuminated line on said photodetector surface, said lens being positioned such that a principal axis of said lens is perpendicular to said first and second planes, and said lens having a secondary axis forming an angle of between about 20 and about 60 degrees with said principal axis, said illuminated line and said photodetector being positioned along said secondary axis on opposite sides of said lens;
    means for determining a coordinate location, from said image, for at least three points along said illuminated line; and
    means for calculating the profile of a surface from the coordinate location of each of said at least three points.

7. A method for measuring the radius of a curved surface, the steps comprising:
    illuminating a line along said surface, said line being defined by an intersection of said surface with a first plane;
    forming an image of said illuminated line;

selecting at least three points along said illuminated line;

identifying a coordinate location of each of said at least three points from said image; and electronically calculating the radius of said surface from said coordinate locations of said at least three points.

8. A method for measuring the radius of a curved surface, the steps comprising:

projecting a line of light onto said surface, along the intersection of said surface with a plane which includes the radius to be measured;

generating an image of said line of light;

dissecting said image into a plurality of picture elements;

identifying a coordinate location for at least three picture elements, each corresponding to a point located on said line of light; and electronically calculating the radius of said surface from said coordinate location of said at least three picture elements.

9. The method according to claim 8, wherein:

said step of generating an image includes the step of focusing light reflected from said surface onto a sensor; and further comprising the step of transducing said image into a multiplicity of electrical signals, said transducing step including the step of scanning said plurality of picture elements to generate a series of electrical pulses, the amplitude of each of said pulses being proportional to the intensity of light associated with a corresponding picture element.

10. The method according to claim 9, wherein:

said sensor comprises a photosensitive array within a television camera; and said step of transducing said image into electrical signals is performed by said camera.

* * * * *